Dec. 18, 1951 — R. W. GIESELER — 2,578,693
COMBINATION MAIL AND NEWS BOX
Filed March 9, 1948 — 4 Sheets-Sheet 1
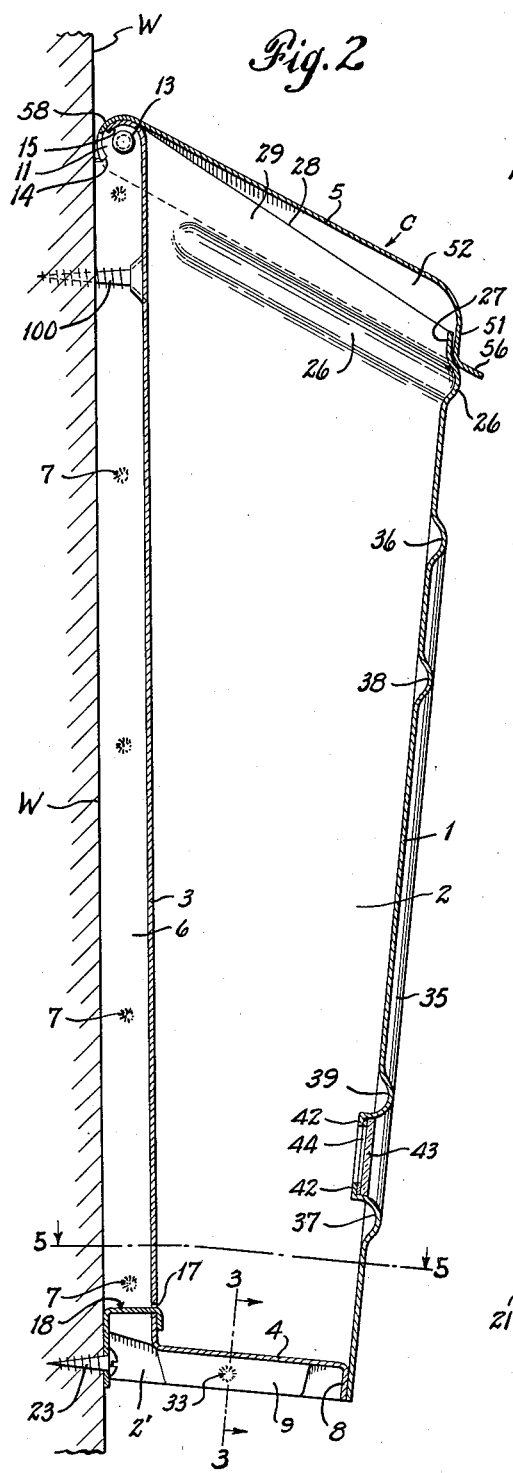
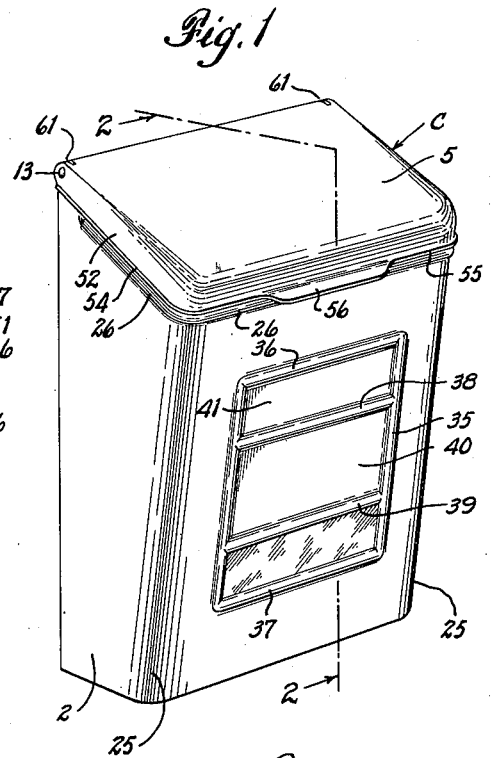
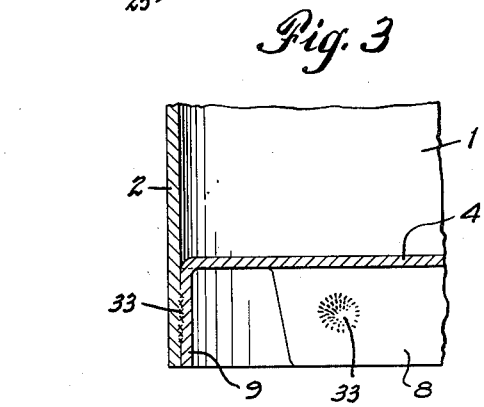
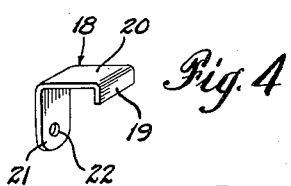
INVENTOR.
RUSSELL W. GIESELER
BY
Austin, Wilhelm + Carlson
ATTORNEYS.

Dec. 18, 1951  R. W. GIESELER  2,578,693
COMBINATION MAIL AND NEWS BOX
Filed March 9, 1948  4 Sheets-Sheet 2
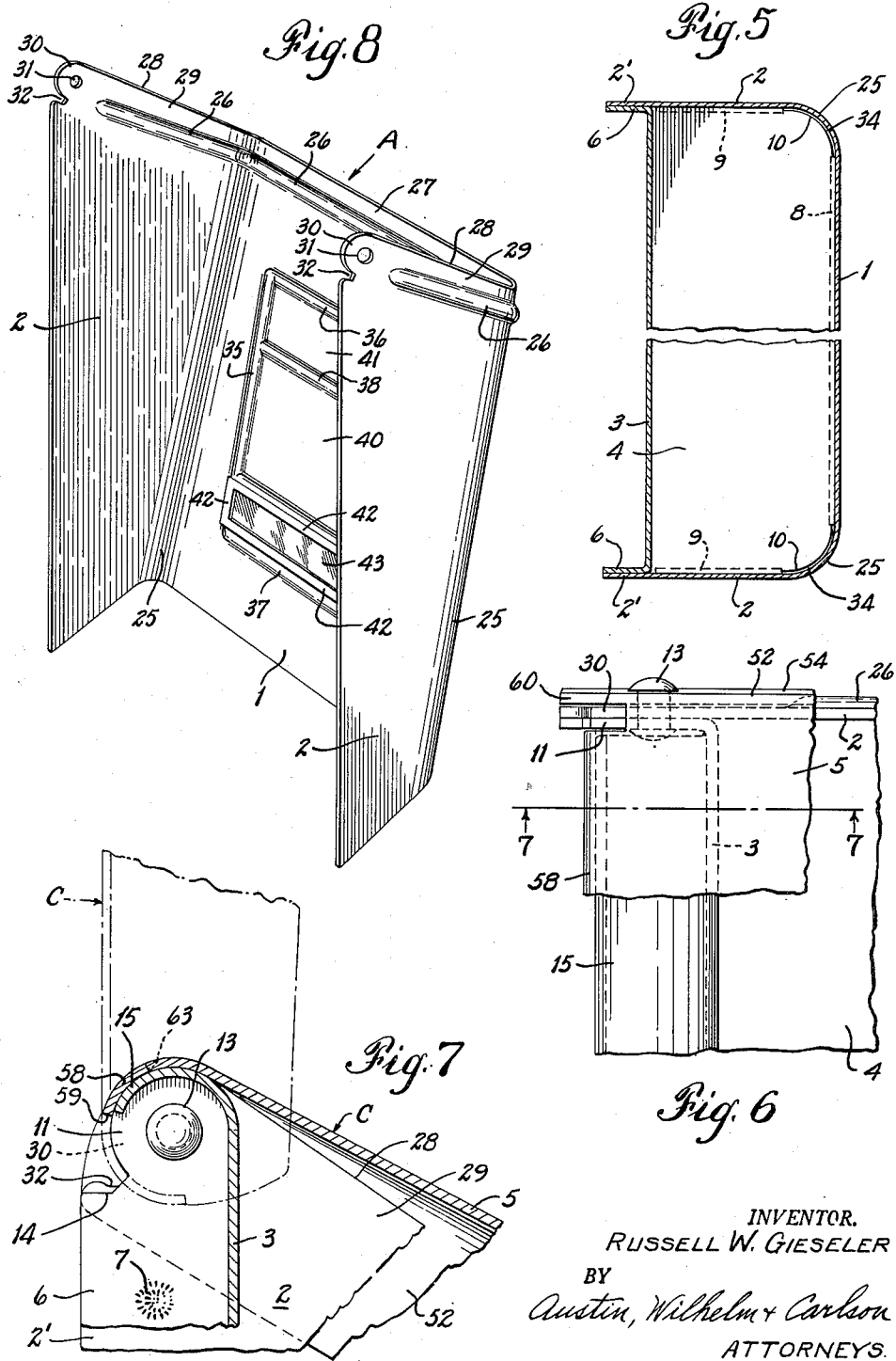
INVENTOR.
RUSSELL W. GIESELER
BY
Austin, Wilhelm + Carlson
ATTORNEYS.

Dec. 18, 1951  R. W. GIESELER  2,578,693
COMBINATION MAIL AND NEWS BOX
Filed March 9, 1948  4 Sheets-Sheet 3
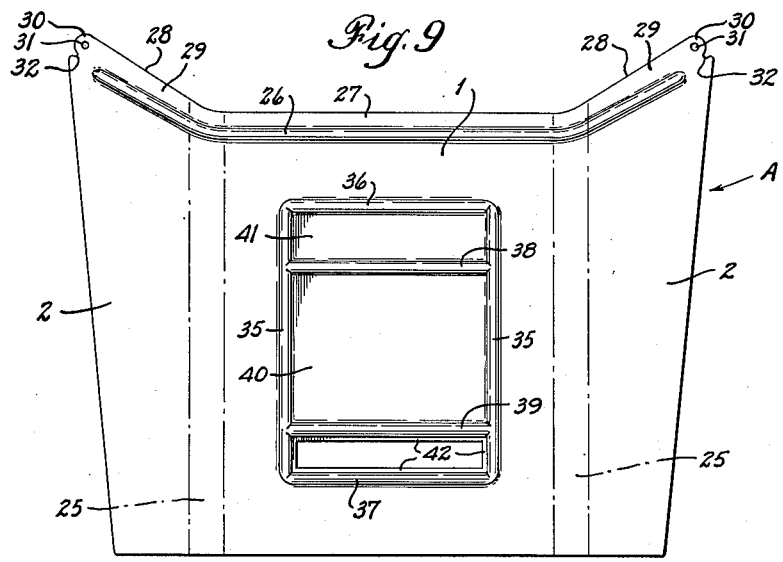
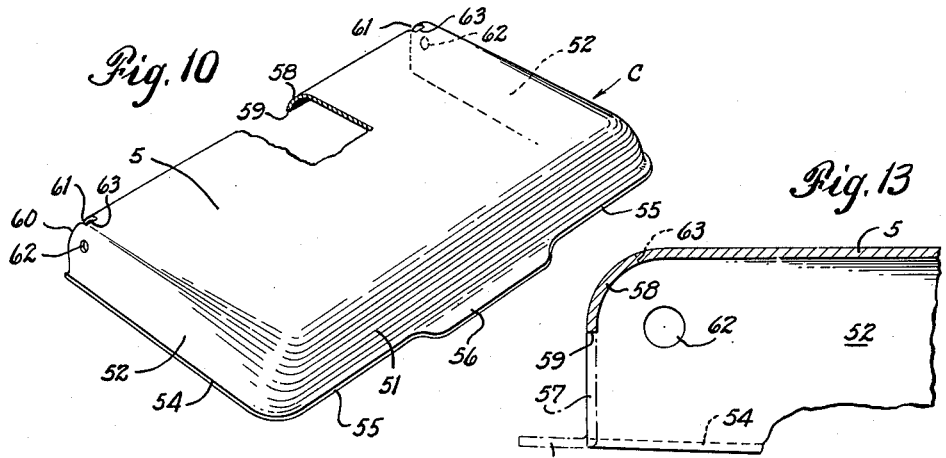
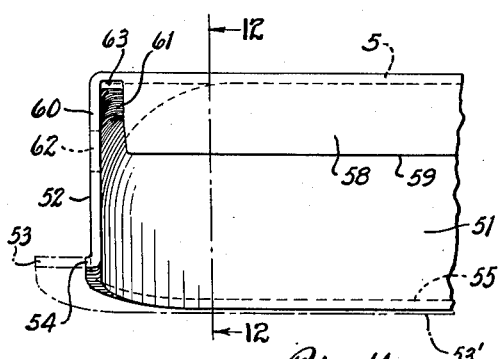
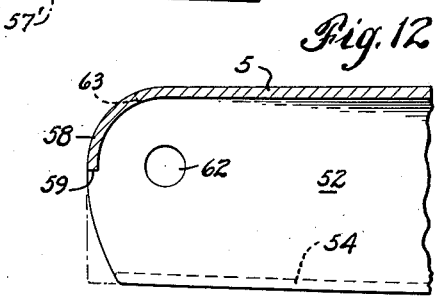
INVENTOR.
RUSSELL W. GIESELER
BY
Austin, Wilhelm + Carlson
ATTORNEYS.

Dec. 18, 1951 R. W. GIESELER 2,578,693
COMBINATION MAIL AND NEWS BOX
Filed March 9, 1948 4 Sheets-Sheet 4
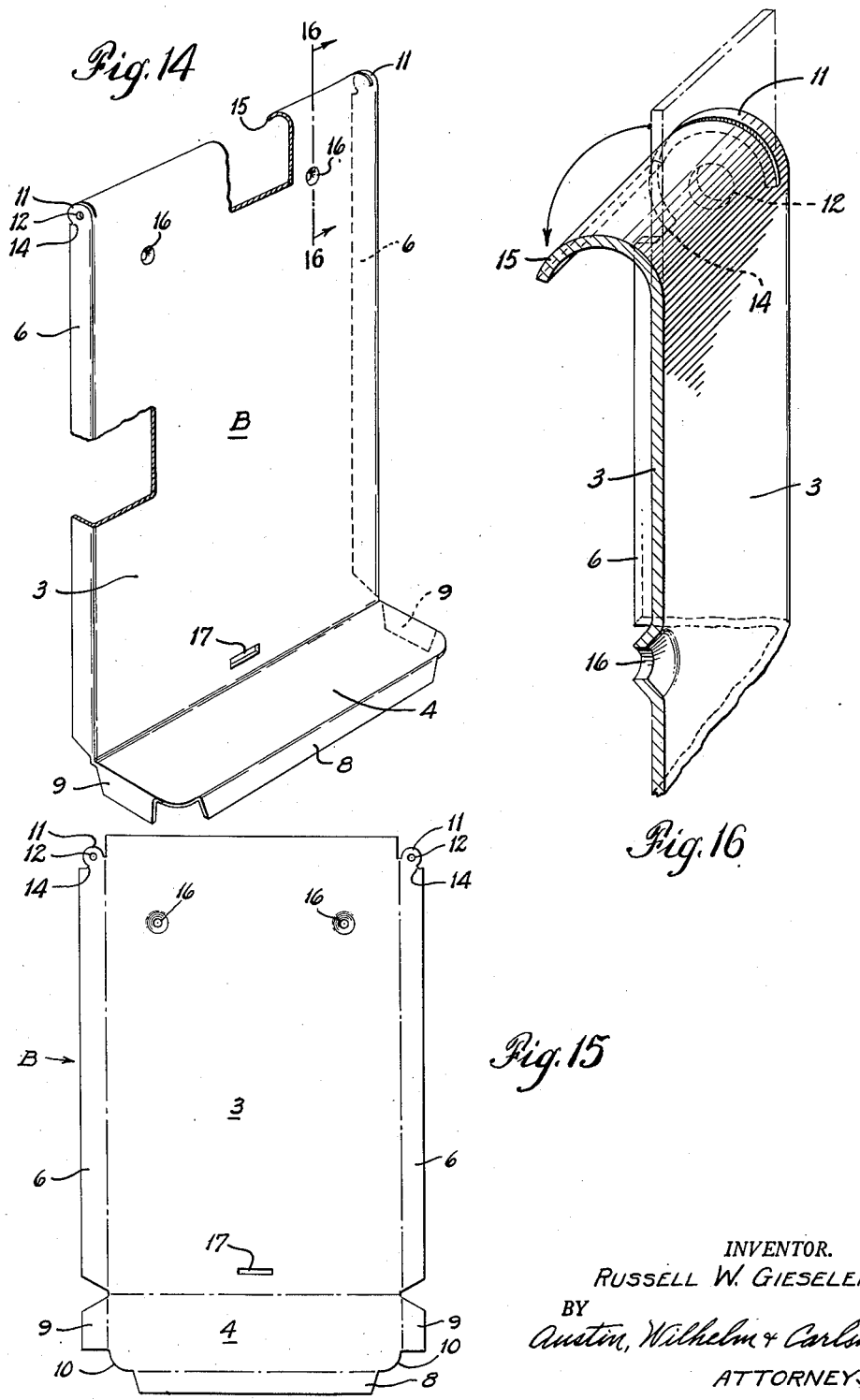
INVENTOR.
RUSSELL W. GIESELER
BY
Austin, Wilhelm & Carlson
ATTORNEYS.

Patented Dec. 18, 1951

2,578,693

UNITED STATES PATENT OFFICE 2,578,693

COMBINATION MAIL AND NEWS BOX

Russell W. Gieseler, Jamestown, N. Y.

Application March 9, 1948, Serial No. 13,831

4 Claims. (Cl. 232—19)

This invention relates to an improved combination mail and news box for residences and business establishments, possessing novel details of construction and providing a convenient receptable for delivered mail, letters, newspapers and magazines. This application is a continuation-in-part of my copending application Serial No. 663,440, filed April 19, 1946.

According to this invention, a commodious news box is provided sufficiently large to serve not only as a letter box, but also as a container and protecting receptacle for large and small magazines and newspapers which are delivered to the residence or business establishment. This all-purpose news box is strong and sturdy in construction, lasting in use, attractive in appearance, and designed to satisfy the needs and conveniences of the resident, postman and news carrier. The improved news box may be economically fabricated from sheet metal and the like with a minimum of material and by relatively few forming and assembly operations. The cover part and box part are reinforced and strengthened at points and areas subjected to greatest strain in a manner to permit formation of a strong and lasting news box from relatively light gauge sheet. The cover part is hingedly mounted on the box part in a manner to shed rain and exclude the entry of water or moisture into the box interior.

Other objects and advantages of this invention will become apparent as the disclosure proceeds.

Although the characteristic features of this invention will be particularly pointed out in the claims, the invention itself, and the manner in which it may be carried out, may be better understood by referring to the following description taken in connection with the accompanying drawings forming a part hereof, in which Fig. 1 is a perspective view of the improved news box.

Fig. 2 is an enlarged vertical cross-sectional view of the box as the same would appear when viewed along line 2—2 of Fig. 1.

Fig. 3 is an enlarged fragmentary cross-sectional detail showing the bottom construction of the news box as the same would appear when viewed along line 3—3 of Fig. 2.

Fig. 4 is a perspective view of the bracket element used to adjustably secure the lower end of the news box to the building wall.

Fig. 5 is a horizontal cross-sectional view of the news box as the same appears when viewed along line 5—5 of Fig. 2.

Fig. 6 is an enlarged fragmentary top view illustrating structural details of the upper end of the box part and cover part at the hinging area.

Fig. 7 is an enlarged fragmentary cross-sectional view showing the upper section of the rear wall panel of the box part and the hinging section of the cover part as the same appears when viewed along line 7—7 of Fig. 6.

Fig. 8 is a perspective view of a blank of sheet material which has been formed and shaped to provide the front wall panel and the side wall panels of the box part.

Fig. 9 is a plan view of a stamped blank as the same appears prior to shaping thereof to form the front wall panel and side wall panel of the news box as shown in Fig. 8.

Fig. 10 is a perspective view of the cover part of the news box, a section thereof being broken away to illustrate certain structural details thereof.

Fig. 11 is an enlarged fragmentary detail view of the rear left corner of the cover part as viewed from the back.

Fig. 12 is a fragmentary cross-sectional view of the cover part showing the curvilinear hip formation at the rear edge thereof as the same appears when viewed along line 12—12 of Fig. 11.

Fig. 13 is a fragmentary cross-sectional view of the cover part when stamped to shape and prior to completion of the curvilinear hip formation at the rear edge thereof.

Fig. 14 is a perspective view of a formed blank shaped to provide the rear wall panel and the bottom wall panel of the news box.

Fig. 15 is a plan view of the cut blank which forms the rear wall panel and the bottom wall panel of the box part shown in Fig. 14 prior to shaping thereof; and Fig. 16 is an enlarged perspective view of a fragmentary section of the rear wall panel showing the upper end portion thereof rolled to curvilinear shape.

Similar reference characters refer to similar parts throughout the several views of the drawings and specification.

There is shown in Figs. 1 and 2, the improved news box which is constructed in a manner to permit high speed production with a minimum of material, of few parts, and at low cost, and at the same time provide a news box which is sturdy and lasting in use, attractive in appearance, and designed to exclude the entry of rain or moisture so that the news material contained therein will be kept dry at all times. The box is preferably formed of sheet material of a non-rusting character such as aluminum, stainless steel, copper or plastic sheet. It will be appreciated that the box may also be formed from materials such as steel or treated fiber sheet, protected from rust or deterioration by a suitable weather resisting coating.

The box part essentially comprises a front wall panel 1 and side wall panels 2 which may be stamped and formed from a single blank of sheet material as shown in Figs. 8 and 9. The rear wall panel 3 and the bottom wall panel 4 of the box part is formed from a single blank B of sheet material as shown in Figs. 14 and 15. The upper end of the box part is closed by a cover part C stamped and formed as shown in Fig. 10 and presenting a top wall panel 5.

The box part is desirably constructed of sufficient height, width and depth to contain and receive one or more large size magazines and a folded Sunday newspaper. For example, the height of the front wall panel 1 may vary from thirteen to fifteen inches, the height of the rear wall panel 3 may vary from fifteen to seventeen inches, the face width of the front wall panel 1 may vary from ten to twelve inches, the depth of the lower end of the news box may vary from two to three and one-half inches, and the depth of the upper end of the news box may vary from four to five inches. The news box, when built in such commodious size, is capable of containing a folded Sunday newspaper and large and small magazines, as well as letters and the usual postal mail.

The rear wall panel 3 of the box part is designed to extend parallel to the building wall W as shown in Fig. 2, from which the box part is suspended by suitable lag or wood screws 100. Parallel flanges 6, extending vertically along the side edges of the rear wall panel 3 as shown in Fig. 5, are designed to rest against the building wall so as to maintain the rear wall panel 3 spaced therefrom and permit the circulation of air between the building wall W and the rear wall panel 3. The rear edge portions 2' of the side wall panels overlap the rear panel flanges 6 and may be secured thereto as by suitable rivets or spot welds 7. The edges 2' of the side wall panels 2 thus form rearwardly extending rib formations which reinforce and strengthen the construction and provide inset spacing of the rear wall panel 3 from the building wall W.

The bottom wall panel 4 as shown in Figs. 2 and 14, is formed integrally with the rear wall panel 3, and so shaped that when the news box is fully assembled, the bottom wall panel is inclined forwardly towards the front wall panel 1 of the news box in its normal hung position on the building wall. The bottom wall panel 4 is formed with a downwardly extending front flange 8 and downwardly extending side flanges 9. Each front corner 10 of the bottom wall panel is generally rounded in shape as shown in Fig. 14 to present a free unflanged edge.

The upper end of each of the rear panel flanges 6 terminates in a semi-circular head portion 11 having a centered hole 12 therein to receive a hinging rivet 13. The neck portion of the rounded head section 11 is notched out as at 14 for reasons which will presently appear. The upper end of the rear wall panel 3 is provided with a curvilinear extension 15 which is shaped into an approximate half-circle and rearwardly overhangs the main wall section of the rear wall panel 3. The semi-circular head sections 11 of the rear wall flanges 6 conform in shape to the rounded contour of the curvilinear extension 15 of the rear wall panel.

The rear wall panel 3 is provided with a pair of socket holes 16 adjacent the upper end thereof into which the lag screws 100 are inserted to secure the news box to the building wall W. The lower end of the rear wall panel 3 may be provided with a slot opening 17 into which an angle shaped wall bracket 18, as shown more particularly in Figs. 2 and 4, may be inserted. The wall bracket 18 may be generally angular in shape to provide a hook portion 19 seating against the inside face of the rear wall panel 3, the rearwardly extending leg section 20 thereof extending through the slot opening 17 in the rear wall panel 3, and the downwardly extending leg section 21 thereof has an opening 22 therein through which a lag or wood screw 23 may be inserted to secure the bracket 18 to the building wall W.

The blank B, which forms the rear wall panel 3 and the bottom wall panel 4, may be cut from a substantially rectangular sheet of metal in the form shown in Fig. 15. The blank B may be cut to shape, the socket holes 16 and the hinge holes 12 punched therein, and the slit hole 17 cut therein, in a single press operation. The side flanges 6 of the rear wall panel 3 can then be bent rearwardly, and the front flange 8 and the side flanges 9 associated with the bottom wall panel can be bent downwardly and the bottom wall panel 4 shaped into position. The upper extension 15 of the rear wall panel 3 is curved rearwardly from its straight line position as shown in dotted lines in Fig. 15. The hinge pin holes 12 in the head sections 11 of the side flanges 6 are located so as to coincide with the axis of curvature of the curvilinear extension 15.

The metal blank A which forms the front wall panel 1 and the side wall panels 2, may be cut to the shape generally shown in Fig. 9, so that when shaped into assembled form the same will appear as shown in Fig. 8. As thus shaped, the side wall panels 2 merge into the front wall panel 1 in a manner to present attractively curved vertical corners 25, as is evident by referring to Figs. 1 and 5. To strengthen the upper end of the box part, an outwardly bulging semi-circular rim 26 is formed to extend horizontally across the front wall panel along a horizontal line slightly below the upper edge thereof to provide a cover receiving top edge section 27. The outwardly bulged rim formation 26 in the front wall panel extends across the curved corner formations 25 and into the side wall panels 2 parallel to but a spaced distance from the inclined upper edge 28 thereof so as to provide flat cover receiving edge sections 29.

The rear upper ends of the side wall panels 2 are each provided with a rounded head section 30 which conforms to the contour of the head sections 11 associated with the rearwardly extending flanges 6 of the rear wall panel 2. The head sections 30 are each provided with a hinge pin receiving hole 31 designed to align with the pin receiving holes 12 in the adjacent head sections 11 associated with the rear wall panel flanges 6. The neck portion of each head section 30 is undercut as at 32 to match with the undercut 14 at the base of the adjacent head sections 11 of the rear wall panel flanges 6.

When the shaped blank A which forms the front wall panel 1 and the side wall panels 2 as shown in Fig. 8, is applied to the shaped blank shown in Fig. 14, the lower ends of the side wall panels 2 will snugly overlap the downwardly extending side flanges 9 associated with the bottom wall panel 4 and are firmly secured thereto as by rivets or spot welds 33. Similarly, the lower end of the front wall panel 1 will overlap the downwardly extending flange 8 associated with the bottom wall panel 4 and is snugly secured thereto as by spot welds 33. The inside face of the curved vertical corners 25 of the front wall panel 1 will snugly conform to the adjacent curved corner edges 10 of the bottom wall panel 4, leaving only an almost imperceptible slit 34 through which any condensation moisture, accumulating within the interior of the news box, may drain.

The lower end of each side wall panel 2 forms with the downwardly extending side flange 9 to which it is spot welded, a reinforcing rib formation which greatly strengthens the construction of the box part. Similarly, the lower end of the front wall panel forms with the downwardly extending front flange 8 of the bottom wall panel 4 to which it is spot welded, a front rib formation which further strengthens the box part construction. Thus it will be appreciated that the rearwardly extending rim formations along the vertical side edges of the rear wall panel, and the downwardly extending rib formations along both the front edge and the side edges of the bottom wall panel, coupled with the outwardly bulging rim formation 26 adjacent the upper ends of the front wall panel 1 and the side wall panels 2, insures a box part construction of very substantial strength, even though made of relatively light gauge metal.

The front wall panel 1 may be provided with decorative rimming to provide an attractive frame design comprising vertically extending rims 35, merging into a pair of upper and lower rims 36 and 37, and a pair of intermediate rims 38 and 39. These rims have an outwardly bulging semi-circular contour as shown more particularly in Figs. 1 and 2. The vertical rims 35 and the intermediate rims 38 and 39 of the framing define therein a notice panel 40 to which the house address numbers may be attached. The upper horizontal rim 36 and the adjacent intermediate rim 38 define, with the vertical rims 35, a second notice panel 41. The space defined within the lower horizontal rim 37, the adjacent intermediate rim 39, and the vertically extending rims 35, define an opening presenting inward extending horizontal ledges 42 against which a transparent window 43 may seat. The transparent window 43 is secured to the outside face of the inwardly extending ledges 42 as by a suitable adhesive 44, in a manner to securely hold the transparent window in position and insure a leak-proof construction. The transparent window 43 is located sufficiently close to the bottom wall panel 4 to make exteriorly visible the smallest mail card which may be dropped into the box.

The sheet metal blank A which forms the front wall panel 1 and the side wall panels 2 may be completely stamped and shaped in the form shown in Fig. 9 in a single press operation. The die used in the press is so constructed as to contour the blank to the proper shape as shown in Fig. 9, form the upper reinforcing rim 26 therein, form the framing rims 35, 36, 37, 38 and 39 therein, cut out the window opening to provide the inwardly extending seating ledges 42, and punch the hinge holes 31, all in one operation. In a second press operation, the cut and stamped blank A as shown in Fig. 9, is shaped to form the rounded vertical corners 25, with the side wall panels 2 extending rearwardly from the front wall panel 1. Thus it will be appreciated that the blank A may be completely shaped and formed to provide the front wall panel and the side wall panels of the box part in two simple high speed press operations, with a minimum of material waste, and at relatively low cost.

The cover part C is formed from a substantially rectangular blank of sheet material which is shaped into the form shown in Fig. 10. The top wall panel 5 of the cover part presents a rounded downwardly extending front flange section 51 which merges into the rounded downwardly extending side flange sections 52. The cover part C is formed in a press forming operation in which the side edges 53 and the front edge 53' of the blank are gripped by the press dies during the shaping operation, each side edge 53 being later cut off to leave a slight outwardly flared water shedding lip 54 at the side edges, as shown more particularly in Fig. 11. The front edge 53' is cut off after shaping to provide a slight outwardly flared lip 55 along the lower edge of the front flange 51, leaving a lip extension 56 to provide a convenient finger grip for lifting the cover.

The rear edge extension of the top wall panel 5 is first drawn to provide a downwardly extending flange 57 and rear edge 57' having a curvilinear hip portion 58 as shown in Fig. 13. The flange 57 is then partly cut off to provide a free edge 59 so that the curvilinear hip extension 58 has an arcuate length of approximately 90° to 120°. The rear end of each side flange 52 is given a rounded curvature 60 conforming approximately to the contour of the curvilinear hip extension 58. A short slit 61 separates the rounded rear end 60 of each side flange 52 from the adjacent end of the curvilinear hip extension 58. A hinge pin hole 62 is punched in the rounded rear end of each side flange 52 in centering alignment with the hinge pin openings 30 and 12 in the side wall panels and the rear panel flanges 6 respectively. The cover part C may thus be inexpensively formed by simple press shaping operations.

The cover part C is so shaped and formed that when in closed position on the box part, the front flange 51 of the cover part will snugly telescope over the top edge section 27 of the front wall panel of the box part, and the side flanges 52 of the cover part will snugly telescope over the top edge sections 29 of the side wall panels 2 of the box part, with the outturned lips 54 and 55 of the cover part snugly seating against the adjacent rim formation 26 of the box part. The curvilinear hip extension 58 of the cover part is so shaped as to snugly embrace the rearwardly overhanging curvilinear extension 15 of the rear wall panel 3, as shown more particularly in Figs. 6 and 7. During hinging movement of the cover part, the curvilinear hip extension 58 thereof will snugly ride over the rearwardly extending curvilinear extension 15 of the rear wall panel.

A hinging rivet 13 is inserted through the hole 62 in each side flange 52 of the cover part, through the adjacent aligning hole 31 in the side wall panel 2, and through the adjacent aligning hole 12 in the side flange 6 of the rear wall panel. Thus each hinge rivet 13 extends through the cover side flange 52, through the adjacent rounded head section 30 of the side wall panel 2, and through the rounded head section 11 of the side flange 6 of the rear wall panel 3, each hinge rivet being headed over at each end thereof. Full opening movement of the hinged cover part is permitted by reason of the slits 61 cut in the rear edge of the cover part in a manner to partially expose the rear edges of the head sections 30 and 11. When the cover part is in full open position, the closed end 63 of each slit 61 will abut against the closed end of the notch 32 at the base of the head section 30, and the closed end of the aligned notch 14 at the base of the head section 11. It will be noted, however, that the terminus end 63 of each slit 61 substantially overhangs the inset rear wall panel 3, so that no water can reach the interior of the box.

In this improved construction, the curvilinear hip extension 58 of the cover part rearwardly overhangs the rear wall panel 3 for a substantial distance, and yet is contained within the area defined by the rearwardly extending flanges 6 of the rear wall panel 3. Thus the curvilinear hip extension 58 of the cover part positively prevents rain water from reaching the interior of the box part, and sheds the water to the rear of the rear wall panel 3. The hinge rivets 13 at each side of the box part are in true alignment, permitting free swinging movement of the cover part, and since each hinge rivet 13 extends through three layers of metal, namely, the rear end of the cover side flange 52, the head section 30 of the side wall panel 2, and the head section 11 of the rear panel side flange 6, an unusually strong and sturdy hinge construction is provided.

While certain novel features of this invention have been above disclosed, it will be understood that various omissions, substitutions and changes may be made by those skilled in the art without departing from the spirit of this invention.

What is claimed is:

1. An improved combination mail and news box formed of sheet material having a box part and a cover part hinged to the box part, said box part having enclosing front, rear, and side wall panels, said rear wall panel having a rear wall section inset between said side wall panels providing a pair of rearwardly extending flange formations adapted to rest against the building wall and maintain said rear wall section spaced from the building wall, said cover part having a top wall section shaped to enclose the upper end of the box part, said rear wall panel having a curvilinear formation extending between the upper ends of said flange formations and rearwardly overhanging the plane of said rear wall section, said top wall section of the cover part having a curvilinear hip extension embracing the curvilinear formation of said rear wall panel to exclude the entry of water into the box interior, said cover part having side flanges designed to embrace the upper end of each of said side wall panels when said cover part is in closed position, and means hingedly connecting each of said cover side flanges to the adjacent upper ends of the adjacent flange formations, each of said flange formations extending vertically when the box is mounted on the building wall and having a notched-out rear edge adjacent the upper end thereof, said rear edge notch being designed to receive the adjacent free edge of said curvilinear hip extension when said cover part is swung to full open position.

2. An improved combination mail and news box formed of sheet material having a box part and a cover part hinged to the box part, said box part having enclosing front, rear, and side wall panels, said rear wall panel having a rear wall section inset between said side wall panels providing a pair of rearwardly extending flange formations adapted to rest against the building wall and maintain said rear wall section spaced from the building wall, said cover part having a top wall section shaped to enclose the upper end of the box part, said rear wall panel having a curvilinear formation extending between the upper ends of said flange formations and rearwardly overhanging the plane of said rear wall section and extending between the adjacent upper ends of said flange formations, said top wall section of the cover part having a curvilinear hip extension embracing the curvilinear formation of said rear wall panel to exclude the entry of water into the box interior, said cover part having side flanges designed to embrace the upper end of each of said side wall panels when said cover part is in closed position, and hinging means for said cover part extending through each of said cover side flanges and the adjacent upper end of each of said flange formations, the rear end of each cover side flange being separated from the adjacent end of said curvilinear hip extension by a slit having a closed end located rearwardly of said rear wall section and shaped to snugly receive the upper end portion of the adjacent flange formation when the cover part is swung into full open position.

3. An improved combination mail and news box formed of sheet material having a box part and a cover part hinged to the box part, said box part having enclosing front, rear, and side wall panels, an outwardly bulging rib formation extending across said front wall panel and a section of each of said side wall panels defining thereabove cover-receiving top edge sections, said cover part having a top wall section, side flange sections and a front flange section, means for hingedly connecting said cover part to said box part, the side flange sections and front flange section of said cover part being designed to telescope over said top edge sections of said side wall panels and front wall panel, the lower edge of each of said side flange sections and front flange section of the cover part having an outwardly flaring water shedding lip designed to substantially seat against and extend over the outwardly bulging rib formation associated with the front wall panel and side wall panels of the box part.

4. An improved combination mail and news box formed of sheet material having a box part presenting enclosing front, rear, bottom and side wall panels, said front wall panel being integrally joined to said side wall panels by vertically extending rounded corners, said bottom wall panel being inset between said side wall panels and front wall panel providing downwardly extending flange formations to reinforce the bottom of said box part, an outwardly bulging rib formation extending across the upper end of said front wall panel and across a substantial section of each of said side wall panels adjacent the upper ends thereof providing strengthening reinforcement for the upper end of said box part, and a stiffening frame substantially centered in said front wall panel formed by outwardly bulging rib formations, said stiffening frame being defined by vertically extending rib formations joined to upper and lower horizontally extending rib formations serving to substantially stiffen and strengthen said front wall panel.

RUSSELL W. GIESELER.

REFERENCES CITED

The following references are of record in the file of this patent:

UNITED STATES PATENTS

| Number | Name | Date |
|---|---|---|
| 472,007 | Witherell | Mar. 29, 1892 |
| 638,126 | Kampfe | Nov. 28, 1899 |
| 719,474 | King | Feb. 3, 1903 |
| 1,175,756 | Hartmann | Mar. 14, 1916 |
| 1,175,865 | Griswold | Mar. 14, 1916 |
| 1,442,344 | Johnson | Jan. 16, 1923 |
| 1,791,243 | Horch | Feb. 3, 1931 |
| 1,827,929 | Bigelow | Oct. 20, 1931 |